United States Patent
Fliam et al.

(10) Patent No.: US 12,513,347 B2
(45) Date of Patent: Dec. 30, 2025

(54) SYSTEMS AND METHODS FOR REDUCED LATENCY STREAMING

(71) Applicant: MK Systems USA Inc., Wilmington, DE (US)

(72) Inventors: Richard Fliam, Wilmington, DE (US); Cory Zachman, Wilmington, DE (US)

(73) Assignee: MK Systems USA Inc., Wilmington, DE (US)

( * ) Notice: Subject to any disclaimer, the term of this patent is extended or adjusted under 35 U.S.C. 154(b) by 24 days.

(21) Appl. No.: 18/470,862

(22) Filed: Sep. 20, 2023

(65) Prior Publication Data
US 2024/0107082 A1 Mar. 28, 2024

Related U.S. Application Data

(60) Provisional application No. 63/408,949, filed on Sep. 22, 2022.

(51) Int. Cl.
*H04N 21/2187* (2011.01)
*H04N 21/2343* (2011.01)
*H04N 21/235* (2011.01)
*H04N 21/433* (2011.01)
*H04N 21/44* (2011.01)
*H04N 21/472* (2011.01)
*H04N 21/478* (2011.01)

(52) U.S. Cl.
CPC ..... *H04N 21/2187* (2013.01); *H04N 21/2343* (2013.01); *H04N 21/2353* (2013.01); *H04N 21/433* (2013.01); *H04N 21/44004* (2013.01); *H04N 21/47217* (2013.01); *H04N 21/478* (2013.01)

(58) Field of Classification Search
CPC .......... H04N 21/2187; H04N 21/2343; H04N 21/2353; H04N 21/433; H04N 21/44004; H04N 21/47217; H04N 21/478; H04N 21/4781; H04N 21/8173; H04N 21/84; H04N 21/2183; H04N 21/845; H04N 21/6587

See application file for complete search history.

(56) References Cited

U.S. PATENT DOCUMENTS

| | | | |
|---|---|---|---|
| 2011/0002376 A1* | 1/2011 | Ahmed | H04N 19/61 375/E7.026 |
| 2013/0159724 A1* | 6/2013 | Kim | H04L 9/0866 713/168 |

(Continued)

OTHER PUBLICATIONS

European Patent Office, Communication, Extended European Search Report issued for European Patent Application No. 23197775.2, dated Jan. 29, 2024, 9 pages.

(Continued)

*Primary Examiner* — Oschita I Montoya
(74) *Attorney, Agent, or Firm* — Norton Rose Fulbright US LLP

(57) ABSTRACT

Disclosed are systems, methods, and devices transmitting live content. There is provided a first delivery path for streaming live content data, without packet reordering, to a player device, and a second delivery path for streaming recorded content data to the player, wherein the system is configured to transition from the first delivery path to the second delivery path in response to a seek and/or rewind request from the player device.

21 Claims, 7 Drawing Sheets

(56) References Cited

U.S. PATENT DOCUMENTS

| | | | |
|---|---|---|---|
| 2015/0049762 A1* | 2/2015 | Mantin | H04L 65/80 |
| | | | 370/390 |
| 2016/0073149 A1* | 3/2016 | Feng | H04N 21/231 |
| | | | 725/115 |
| 2016/0316244 A1* | 10/2016 | Biagini | H04N 21/25875 |
| 2018/0102965 A1* | 4/2018 | Hari | H04L 12/185 |
| 2018/0199080 A1* | 7/2018 | Jackson, Jr. | H04N 21/2187 |
| 2019/0200054 A1* | 6/2019 | Dharmaji | H04L 65/80 |
| 2022/0122426 A1* | 4/2022 | Dillon | G07F 17/3239 |
| 2023/0216947 A1* | 7/2023 | Bernardi | H04L 67/10 |
| | | | 713/150 |

OTHER PUBLICATIONS

ISO: the International Organization for Standardization, ISO 13818-1, Information technology—Generic coding of moving pictures and associated audio information, https://www.iso.org/standard/74427.html, Mar. 2018; 3 pages.

Dash Industry Forum Report: DASH and WebRTC-Based Streaming, https://dashif.org/webRTC/report, Feb. 2022, 39 pages.

* cited by examiner

SYSTEMS AND METHODS FOR REDUCED LATENCY STREAMING

CROSS REFERENCE

This application claims priority from U.S. Provisional Patent Application No. 63/408,949 filed on Sep. 22, 2022, entitled "SYSTEMS AND METHODS FOR REDUCED LATENCY STREAMING" the disclosure of which is hereby incorporated by reference in its entirety.

FIELD

This disclosure relates to streaming data, and more particularly relates to reduced latency streaming.

BACKGROUND

Streaming of live video and/or audio content to end users over the Internet, such as via an over-the-top media service, has become pervasive. Commonly, a content stream is transmitted using HTTP or HTTPS protocol and received at an end user's device via Media Source Extensions within a web browser. Such transmission often has high latency, which may be undesirable for live content.

Accordingly, there is need for improved or alternate ways of streaming content data to end users.

SUMMARY

In accordance with one aspect, there is provided a computer-implemented system for transmitting live content. The system includes a first delivery path for streaming live content data, without packet reordering, to a player device, and a second delivery path for streaming recorded content data to the player, wherein the system is configured to transition from the first delivery path to the second delivery path in response to a seek and/or rewind request from the player device.

In accordance with another aspect, there is provided a computer-implemented method for transmitting live content. The method includes streaming live content data, via a first delivery path without packet reordering, to a player device, and in response to receiving a seek and/or rewind request from the player device, transitioning to streaming recorded content data, via a second delivery path.

In accordance with a further aspect, there is provided a player device comprising: at least one processor; memory in communication with the at least one processor; software code stored in the memory, which when executed at the at least one processor causes the device to: receive, by way of a first delivery path, a stream of live content data without packet reordering; in response to user input to seek and/or rewind content, request a stream of recorded content data by way of a second delivery path.

Many further features and combinations thereof concerning embodiments described herein will appear to those skilled in the art following a reading of the instant disclosure.

BRIEF DESCRIPTION OF THE DRAWINGS

In the figures.

These drawings depict exemplary embodiments for illustrative purposes, and variations, alternative configurations, alternative components and modifications may be made to these exemplary embodiments.

DETAILED DESCRIPTION

Figure 1:
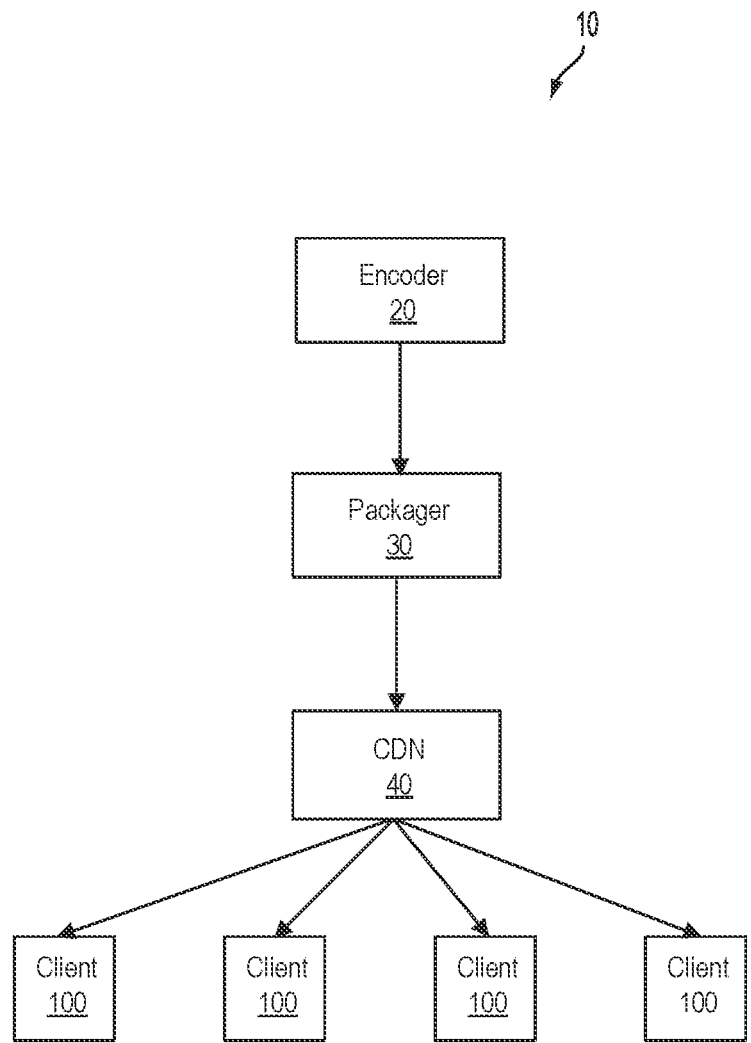
FIG. 1 is a schematic diagram of a conventional content streaming system.

FIG. 1 is a high-level schematic diagram of a conventional content streaming system 10 for streaming live content. Content streaming system 10 may operate as part of an over-the-top (OTT) media service that delivers content to end users.

As depicted, content streaming system 10 includes an encoder 20, a content packager 30, a content delivery network 40, and a plurality of client devices 100.

Encoder 20 encodes live content data to be suitable for streaming via HLS or MPEG-DASH. Content packager 30 serves as a content origin server for an OTT media service. Content packager 30 transmits live content data to client devices 100 by way of content delivery network 40. The transmission is by way of the HTTP or HTTPS application-layer protocol on top of the TCP (Transmission Control Protocol) transport-layer protocol. Content delivery network 50 includes a distributed network of proxy servers and data caches interconnected by way of a communication network.

Each client device 100 is a device operable by an end user to play streamed content. Content data may be received at client device 100 via a Media Source Extensions (MSE) component within a web browser executing at client device 100.

The delivery of live content via content streaming system 10 often has high latency. One contributor to latency is the use of TCP as a transport-layer protocol, which presents head-of-line blocking issues for packet delivery. Another contributor to latency is the various buffers in content delivery network 50.

For example, in some situations, latency within content streaming system 10 including transmission via content delivery network 40 may be between 15-40 seconds. Latency of such magnitude may be undesirable for live content and certain applications (e.g., gaming, betting, or the like).

Figure 2:
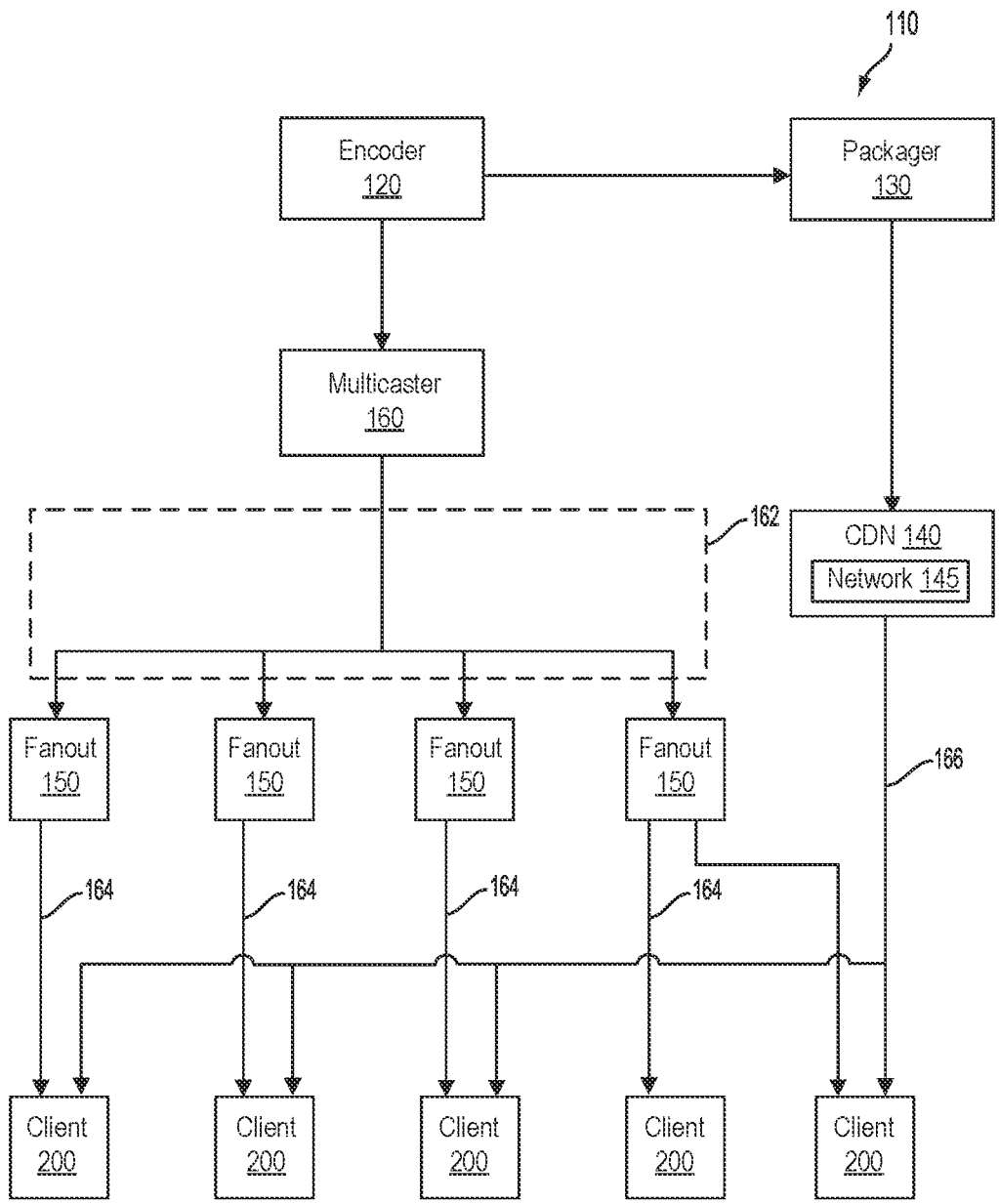
FIG. 2 is a schematic diagram of a content streaming system, in accordance with an embodiment.

FIG. 2 is a high-level schematic diagram of a content streaming system 110 for streaming live content, in accordance with an embodiment. Content streaming system 110 may be used, for example, as part of an OTT media service that delivers content to end users. The live content may include, for example, audio and/or video content.

As detailed herein, in some embodiments, content streaming system 110 provides certain technical advantages compared to content streaming system 10. For example, in some embodiments, content streaming system 110 provides reduced latency delivery of live content compared to content streaming system 10.

As depicted, content streaming system 110 includes an encoder 120, a content packager 130, a content delivery network 140, a plurality of fanout nodes 150, a multicaster 160, and a plurality of client devices 200.

As detailed herein, in some embodiments, content streaming system 110 provides at least two delivery paths including a first delivery path via fanout nodes 150 that provides for reduced latency transmission, and a second delivery path via content delivery network 140.

Encoder 120 encodes live content data to be suitable for delivery into an MSE component of a web browser executing at a client device 200. In the depicted embodiment, content data is encoded to provide an adaptive bitrate (ABR) stream. In the depicted embodiment, live content data is encoded into a plurality of content segments. Each segment provides a portion of live content for playout at a client device 200.

In the depicted embodiment, each content segment is encoded into an DASH or HLS compatible format, which is transmuxed for streaming transmission (e.g., via RTP). Consequently, a file format (e.g., MPEG-4) is wrapped into a streaming format (e.g., RTP). In some embodiments, another suitable file format that can be readily decoded by the MSE component (e.g., without transmuxing) at client device 200 may be used.

Conveniently, wrapping the file format in this manner may be used in some embodiments to preserve media capabilities commonly supported by web browsers such as, for example, digital rights management (DRM), content seek/rewind functionality, time-synchronized metadata, thumbnails, stream replacement, or the like. Such media capability would not be available, if content is streamed in a streaming format without the noted wrapping (e.g., raw H.264 data via Web Real-Time Communication).

Encoder 120 may encrypt content segments, e.g., using a suitable session key.

Encoder 120 may receive live content data for encoding from one or more content sources (not shown), each of which may be a conventional source of audio and/or video content such as, for example, a television station or an Internet live stream. For example, encoder 120 may receive linear content data by way of a satellite signal, a radio frequency (RF) antenna signal. Content data may be received at encoder 120 in various formats and bitrates.

Encoder 120 provides encoded content data to multicaster 160. In the depicted embodiment, encoder 120 streams content data to multicaster 160 using Real-time Transport Protocol (RTP). Accordingly, RTP packets are generated with respective payloads that provide the content segments encoded at encoder 120. In some embodiments, encoder 120 may stream content data to multicaster 160 using another suitable protocol for low-latency streaming that uses, for example, User Datagram Protocol (UDP).

Multicaster 160 receives a stream of content data from encoder 120. In turn, multicaster 160 streams, via a multicast transmission 162, the content data to a plurality of fanout nodes 150. In the depicted embodiment, multicast transmission 152 uses a virtual multicast. In some embodiments, multicast transmission 162 uses a physical multicast or a combination of virtual and physical multicast.

In the depicted embodiment, multicaster 160 multicasts content data to fanout nodes 150 using RTP. Thus, the RTP packets have a payload that provides the content segments encoded at encoder 120. In some embodiments, multicaster 160 may multicast content data to fanout nodes 150 using another suitable protocol for low-latency streaming that uses, for example, UDP.

A fanout node 150 receives a stream of content data from multicaster 160. In turn, fanout node 150 streams the content data, via a unicast transmission 164, to one or more client devices 200.

Figure 3:
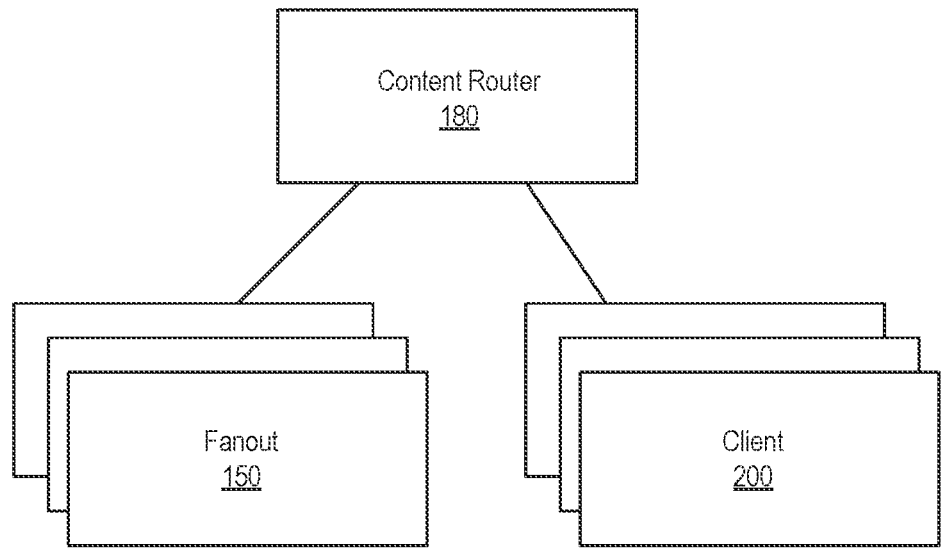
FIG. 3 is a schematic diagram of a content router interconnected with a fanout node and a client device, in accordance with an embodiment.

Fanout node 150 streams the content data to particular associated client devices 200. The particular client devices 200 to receive content data from a fanout node 150 are identified by a content router 180 (FIG. 3).

Fanout node 150 streams the content data into an MSE component of a web browser executing at a client device 200. In the depicted embodiment, unicast transmission 164 uses Stream Control Transmission Protocol (SCTP). Notably, in this embodiment, SCTP is used with optional reliability and re-ordering functionality disabled so that unicast transmission 164 may have latency characteristics similar to UDP (rather than TCP).

In the depicted embodiment, fanout node 150 serves as an alternate content origin to content packager 130. In some embodiments, fanout node 150 generates a playlist of available content segments and provides this playlist to client device 200.

In some embodiments, fanout node 150 precaches ad content data for ad insertion opportunities identified in a playlist. In such embodiments, fanout node 150 streams ad content data instead of primary content data to client device 200 at an ad insertion opportunity. Ad content data may be transmitted by way of unicast transmission 164.

In the depicted embodiment, fanout node 150 is a residential gateway that connects a residential local area network (LAN) to a wide area network (WAN). In some embodiments, fanout node 150 is an existing device adapted with custom software code to perform the functions disclosed herein. The custom software may be provided to an existing device, e.g., by way of a software update. In some embodiments, fanout node 150 may, for example, be a router, switch, hub, set-top box or other device that provides connection between a LAN and a WAN. In some embodiments, fanout node 150 is located in the same home as one or more associated client devices 200. In some embodiments, fanout node 150 and one or more client devices 200 are located on the same residential LAN.

In some embodiments, fanout node 150 is not located on a LAN, but rather on the public Internet or as part of an operator network (e.g., a network of the operator of encoder 120). In some embodiments, fanout node 150 is a server located in the cloud.

Encoder 120 also provides encoded content data to content packager 130. In the depicted embodiment, encoder 120 streams encoded content data to content packager 80 via HTTP or HTTPS on top of TCP.

Content packager 130 serves as a content origin. Content packager 130 generates a manifest data structure that includes data describing content available for access by client devices 200. For example, the manifest data structure may describe available content segments (as provided by encoder 120). The manifest data structure may also be referred herein to as a playlist.

Content packager 130 streams one or more content segments to a web browser at a client device 200 upon request. In particular, content packager 130 streams the content segment into an MSE of a web browser executing at a client device 200. In the depicted embodiment, content packager 130 uses a streaming protocol such as HLS or MPEG-DASH over HTTP or HTTPS. In some embodiments, content packager 130 is a just-in-time packager.

Content delivery network 140 includes a communication network 145 and a distributed plurality of proxy servers and data caches. Communication network 145 may include a packet-switched network portion, a circuit-switched network portion, or a combination thereof. Communication network 145 may include wired links, wireless links such as radio-frequency links or satellite links, or a combination thereof. Communication network 145 may include wired access points and wireless access points. Portions of communication network 145 could be, for example, an IPv4, IPv6, X.25, IPX or similar network. Portions of communication network 145 could be, for example, a GSM, GPRS, 3G, LTE or similar wireless networks. communication network 145 may include or be connected to the Internet. When communication network 145 is a public network such as the public Internet, it may be secured as a virtual private network.

Each client device 200 is a device operable by an end user to play streamed content. For example, a client device 200 may be a digital media player, a set-top box, a video game console, each connected to a display device for playing streamed content. A client device 150 may also be smart television device or a personal computing device such as a laptop computer, a tablet computer or a smartphone, each having an integrated display screen for playing streamed content. A client device 150 may be also referred to herein as a player device.

In the depicted embodiment, streamed content is received within an MSE component of a web browser executing at client device 200. In some embodiments, streamed content is received via another component that implements a suitable specification other than MSE. In some embodiments, streamed content is received via another component at an Encrypted Media Extensions (EME) layer or a application playback layer. In some embodiments, such other components may implement another specification compatible with HTML5 video and/or audio.

Convenient, in the depicted embodiment, the use of RTP (and UDP) for transmission from encoder 120 to multicaster 160, and from multicaster 160 to fanout nodes 150 avoids head-of-line blocking issues typically associated with TCP transmission. Similarly, in the depicted embodiment, the use of SCTP (configured as disclosed herein) for transmission from fanout node 150 to client device 200 also avoids head-of-line blocking issues typically associated with TCP transmission. This avoids latency associated with TCP transmission. Furthermore, this transmission path from encoder 120 to client device 200 avoids latency associated with transmission through various data buffers in content delivery network 150.

FIG. 3 is a high-level schematic diagram showing a content router 180 interconnected with a plurality of fanout nodes 150 and a plurality of client devices 200, in accordance with an embodiment. Content router 180 facilitates connection and association between particular ones of the fanout nodes 150 and particular ones of the client devices 200 (e.g., via a unicast transmission 162).

Content router 180 may receive a content request from a client device 200 e.g., for a particular piece of content, a particular channel, or the like, and then select a particular fanout node 150 to provide the requested content. The particular fanout node 150 may be selected based on one or more criteria including, for example, content available at the particular fanout node 150, proximity to the client device 200, network latency to client device 200, amongst other criteria.

In response to a content request from client device 200, content router 180 sends an address identifier of the selected fanout node 150 to the client device 200, including for example an IP address and port number of the fanout node 150.

When the selected fanout node 150 and the client device 200 are located on the same LAN, content router 180 functions as a Session Traversal Utilities for NAT (STUN) server. In some embodiments, content router 180 supports the use of the Interactive Connectivity Establishment (ICE) standard when serving as a STUN server. In some embodiments, another network element may function as the STUN server.

Content router 180 serves as an intermediary that is trusted by both a client device 200 requesting content and the particular fanout node 150 selected to provide the requested content, and is able to broker secure communication therebetween. In the depicted embodiment, content router 180 hosts a web server with a valid server certificate that is trusted by both client device 200 and fanout node 150.

In the depicted embodiment, content router 180 is implemented as a WebSocket server, and communicates with one or both of fanout node 150 and client device 200 by way of a WebSocket protocol.

In some embodiments, content router 180 is located on the public Internet. In some embodiments, content router 180 is located as part of an operator network (e.g., a network of the operator of content packager 130).

Figure 4:
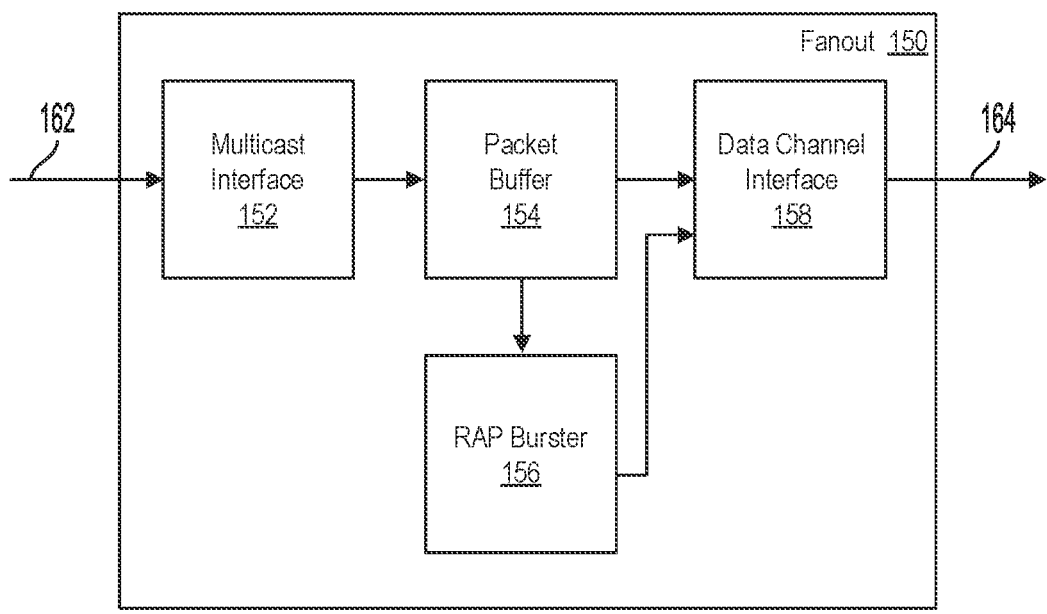
FIG. 4 is a schematic diagram of a fanout node, in accordance with an embodiment.

FIG. 4 is a high-level schematic diagram of fanout node 150, in accordance with an embodiment. As depicted, fanout node 150 includes a multicast interface 152, a packet buffer 154, a random access point (RAP) burster 156, and a data channel interface 158.

Multicast interface 152 receives content data by way of multicast transmission 162. Content data is received in RTP packets via UDP. Received RTP packets are provided to packet buffer 154, for forwarding to one or more client devices 200.

In the depicted embodiment, RTP packets received out of order at fanout node 150 may be provided out of order to a client device 200.

Packet buffer 154 is a data buffer for storing RTP packets received by multicast interface 152. Packet buffer 154 may store packets for at least parts of one or more content segments. Buffered packets are retrieved from packet buffer 154 by RAP burster 156 and data channel interface 158, as required.

RAP burster 156 determines boundaries in the content data at which decoding at client device 200 can begin. Such boundaries may be located, for example, at particular frames in a group of pictures (GOP), or a forward picture boundary, or the like. When fanout node 150 receives a request for particular content from a client device 150, RAP burster 156 retrieves buffered packets from packet buffer 154 beginning at the determined boundary and causes the packets to be transmitted by way of data channel interface 158 to client device 200.

Conveniently, RAP burster 156 causes client device 150 to be provided with portions of content data that can be immediately decoded without waiting for a suitable boundary in the live stream (e.g., of transmission 162). Transmission under control of RAP burster 156 ceases once decoding at client device 200 catches up to packets provided in the live stream.

Data channel interface 158 provides a unicast transmission 164 of content data to client device 200. In the depicted embodiment, unicast transmission 164 uses the Web Real-Time Communication (WebRTC) protocol. In particular, data channel interface 158 establishes a WebRTC Data Channel for transmitting unicast transmission 164 via SCTP. In some embodiments, data channel interface 158 packages RTP packets in packet buffer 154 into messages for SCTP transmission.

Data channel 158 transmits packets of the live stream as retrieved from packet buffer 154. Upon initial connection with client device 200, data channel 158 transmits packets preceding the live stream under control of RAP burster 156.

In the depicted embodiment, the WebRTC Data Channel is configured with optional reliability and re-ordering functionality disabled.

Conveniently, in some embodiments, use of the WebRTC protocol supports the ability of content router 180 to broker the sharing of encryption parameters, keys, and/or secrets by fanout node 150 and client device 200 in advance of establishing a WebRTC Data Chanel communication. In particular, content router 180 brokers the sharing of such encryption parameters, keys, and/or secrets by way of a WebRTC "offer" and "answer" exchange between fanout node 150 and client device 200. In some embodiments, encryption in communication between gateway 200 and client device 150 may use Datagram Transport Layer Security (DTLS) encapsulation of SCTP.

Figure 5:
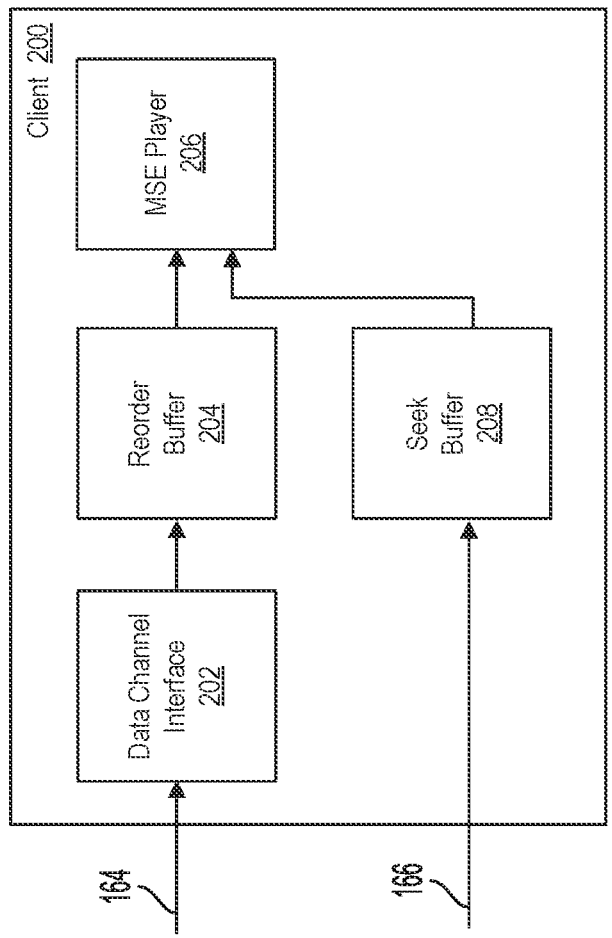
FIG. 5 is a schematic diagram of a client device, in accordance with an embodiment.

FIG. 5 is a high-level schematic diagram of client device 200, in accordance with an embodiment. As depicted, client device 200 includes a data channel interface 202, a reorder buffer 204, an MSE player 206, and a seek buffer 208.

Data channel interface 202 receives content data by way of unicast transmission 164 from fanout node 150. Unicast transmission 164 is received using the WebRTC protocol. Data channel interface 202 establishes a WebRTC Data Channel for receiving unicast transmission 164 via SCTP. As noted, the WebRTC Data Channel is configured with reliability and re-ordering functionality disabled.

Data channel interface 202 stores RTP packets received via the WebRTC Data Channel in reorder buffer 204. Data channel interface 202 stores RTP packets in reorder buffer 204 in proper packet order. In the depicted embodiment, packet reordering and recovery of loss packets is performed at the application-layer rather than at a lower layer such as the transport layer. This provides control at the application layer for response to network latency and disruption. For example, a time-out period for lost packets may be set at an application layer based on latency requirements of the particular application (e.g., MSE player 206).

In some embodiments, at least some packets arriving out of order may be discarded to avoid latency caused by reordering. In some embodiments, data channel interface 202 may request retransmission of one or more missing packets. In some embodiments, at least some missing packets may be ignored to avoid latency caused by retransmission.

Reorder buffer 204 is a data buffer for storing in-order RTP packets, as provided by data channel interface 202.

MSE player 206 is an application for playing content data. MSE player 206 may be within a web browser executing at client device 200. From time to time, including at launch, MSE player 206 requests a content playlist, which may be provided by either fanout node 150 or content packager 130. Based on the content playlist, MSE player 206 requests particular content segments as required for playout of live content.

MSE player 206 recovers content data (e.g., in MPEG-4 format) from the payload of RTP packets in reorder buffer 204 and provides it to an MSE component of the web browser for playout. MSE player 206 supports functionality of a conventional media player including, for example, DRM, content seek/rewind functionality, and use in-band metadata, or the like.

In response to a seek/rewind request from the user, MSE player 206 checks whether the requested content is present in reorder buffer 204. If the requested content is present, MSE player 206 retrieves the appropriate content for playback. In some situations, however, the requested content may not be present in reorder buffer 204. Such situations include, for example, when the user makes a seek request for content prior to client device 200 beginning to receive the live stream for that content (e.g., prior to a user tuning into a particular channel). In such situations, MSE player 206 requests one or more content segments from content packager 130. Such one or more content segment may include a segment identified in a playlist. Content packager 130 transmits the requested one or more content segments to MSE player 206 by way of content distribution network 140 via unicast transmission 166. Unicast transmission 166 may utilize the HTTP or HTTPS protocol (on top of TCP).

In the depicted embodiment, during operation, client device 200 may receive content data by way of at least two delivery paths. Client device 200 may receive live content data via a first delivery path through a fanout node 150, which provides for reduced latency transmission. The first delivery path includes multicast transmission 162 as a path portion and unicast transmission 164 as a further path portion. Client device 200 may receive recorded content data (recorded earlier in a live stream) via a second delivery path through content delivery network 140. Client device 200 may dynamically switch between these two delivery paths, as required, e.g., in response to the particular content requested by a user, in response to a seek request, etc.

The operation of content streaming system 110 is further described with reference to the flowchart depicted in FIG. 6, in accordance with an embodiment.

Content streaming system 110 performs the example operations depicted at blocks 600 and onward.

At block 602, live content data is streamed via a first delivery path without packet reordering, to a player device (e.g., client device 200).

At block 604, a seek and/or rewind request is received from the player device. The request includes a request for one or more content segments of the live stream prior to the player device beginning to receive the live content data.

In response to this request, at block 606, recorded content data (of a prior content segment of the live stream) is streamed, via a second delivery path, to the player device.

Figure 6:
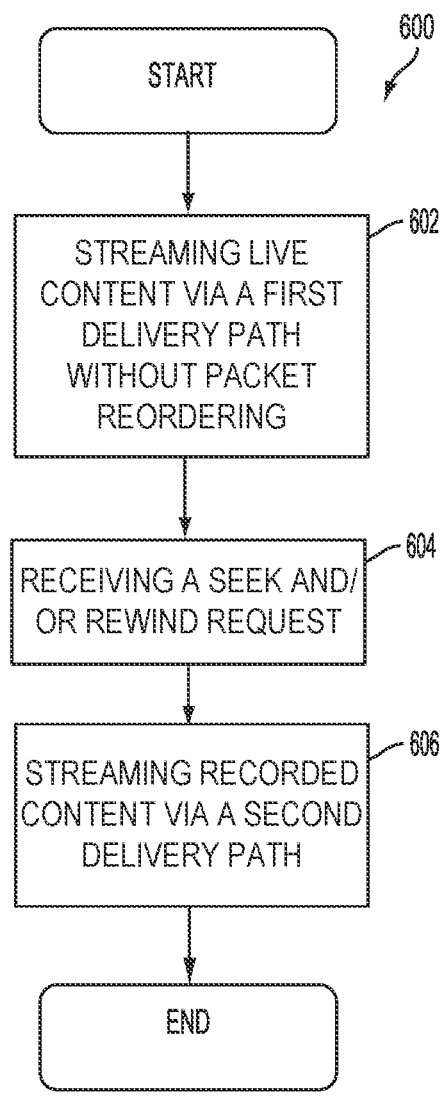
FIG. 6 is a flowchart of example operations performed at the content streaming system of FIG. 2, in accordance with an embodiment.

It should be understood that steps of one or more of the blocks depicted in FIG. 6 may be performed in a different sequence or in an interleaved or iterative manner. Further, variations of the steps, omission or substitution of various steps, or additional steps may be considered.

In some embodiments, content streaming system 110 is adapted for a betting application. In this embodiment, content streaming system 110 utilizes in-band metadata supported by the file format of content segments transmitted to client devices 200. In particular, encoder 120 encodes within content segments metadata describing one or more betting events. The metadata are time synchronized to the content, e.g., on a per-frame basis. In some embodiments, the metadata are included as in-band ID3 information. In some embodiments, the metadata are included in another suitable format.

A betting event may, for example, relate to an opportunity for a user of a client device 200 to make a bet based on the live content. Encoder 120 may detect a betting opportunity in the live content and generate metadata describing such opportunity. In one example, in the context of a baseball game, encoder 120 may detect that a pitcher is ready to throw a pitch, and generate metadata describing an opportunity to place a bet on the pitch outcome (e.g., whether it is a ball or a strike), or to place a bet on the type of pitch (e.g., whether it is a fastball, change-up, curve-ball, or the like). In another example, in the context of a hockey game, encoder 120 may detect that a team is on a power play, and generate metadata describing an opportunity to place a bet on whether or not that team will score a goal during the power play. Various other betting games and betting opportunities may be implemented at content streaming system 110.

Figure 7:
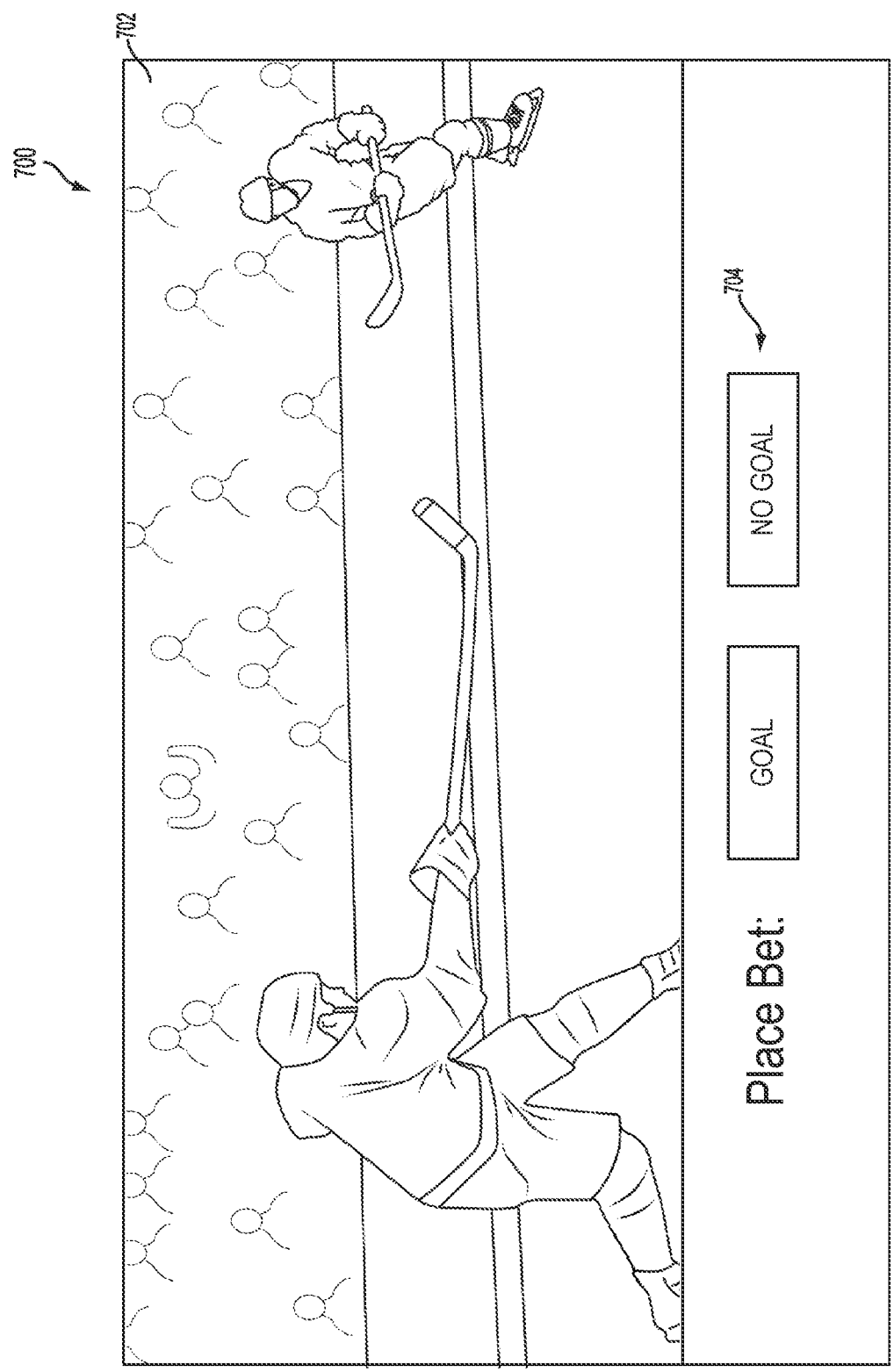
FIG. 7 is an example screen presented at a client device, in accordance with an embodiment.

At client device 200, during playout of the live content, the metadata is decoded, e.g., by MSE player 206. The betting opportunity is displayed at the client device 200. FIG. 7 shows an example screen 700 displayed at client device 200 showing a betting opportunity, in accordance with an embodiment. As depicted, screen 700 displays live content 702 in visual connection (e.g., concurrently) with betting options.

In some embodiments, MSE player 206 receives user input corresponding to selection of one or more betting options, indicating a user's request to place a bet. This request may be transmitted by MSE player 206 to a bet settlement server, e.g., by way of the WebRTC Data Channel and other network path. The request may include a time stamp of when the bet was placed.

Reduced latency streaming of live content is desirable in some betting applications because it is desirable to allow users can make a bet as close as possible to the particular outcome or event that is subject of a bet. When latency is reduced, the window for a user to make a bet is extended to be closer in time to the particular outcome or event.

In the embodiments described above, multicaster 160 transmits RTP packets via multicast transmission 162 to a plurality of fanout nodes 150, which relays the RTP packets to client devices 200. In some embodiments, multicaster 160 transmits RTP packets directly to client devices 200. In such embodiments, client devices 200 are configured to receive a multicast transmission. In such embodiments, one or more fanout nodes 150 may be omitted.

Embodiments have been described herein which use WebRTC protocol for communication between a fanout node 150 and client device 200. In other embodiments, another protocol that allows transmission of content data directly into a web browser may be used.

References herein to "real-time" refer to low-latency communication suitable for streaming of live content. For example, real-time as used herein may refer to quasi real-time or near real-time communications.

Figure 8:
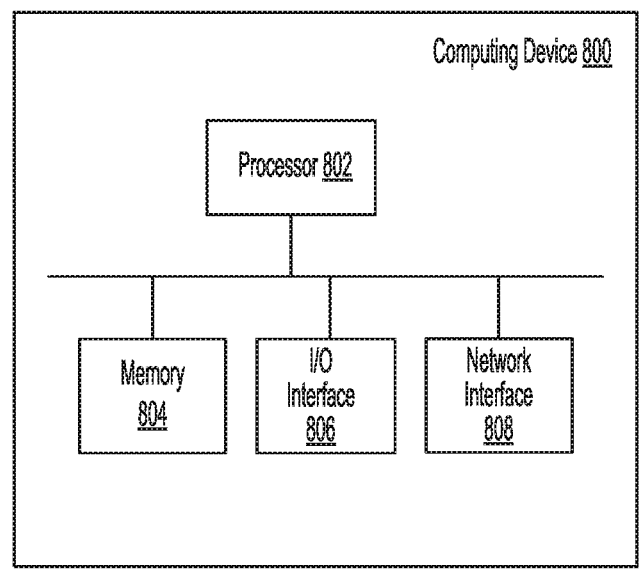
FIG. 8 is a schematic diagram of a computing device, in accordance with an embodiment.

FIG. 8 is a schematic diagram of computing device 800 which may be used to implement various elements of content streaming system 110, in accordance with an embodiment. In one example, computing device 800 may be used to implement a fanout node 150. In another example, computing device 800 may be used to implement a client device 200.

As depicted, computing device 800 includes at least one processor 802, memory 804, at least one I/O interface 806, and at least one network interface 808.

Each processor 802 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 804 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 804 may be used to implement the data buffer disclosed herein (e.g., packet buffer 154, reorder buffer 204, and so on).

Each I/O interface 806 enables computing device 800 to interconnect with one or more input devices, such as a keyboard, mouse, camera, touch screen and a microphone, or with one or more output devices such as a display screen and a speaker.

Each network interface 808 enables computing device 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

For simplicity only, one computing device 800 is shown but system 110 may include multiple computing devices 800. The computing devices 800 may be the same or different types of devices. The computing devices 800 may be connected in various ways including directly coupled, indirectly coupled via a network, and distributed over a wide geographic area and connected via a network (which may be referred to as "cloud computing").

For example, and without limitation, a computing device 800 may be a server, network appliance, set-top box, embedded device, computer expansion module, personal computer, laptop, personal data assistant, cellular telephone, smartphone device, UMPC tablets, video display terminal, gaming console, or any other computing device capable of being configured to carry out the methods described herein.

The foregoing discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Of course, the above described embodiments are intended to be illustrative only and in no way limiting. The described embodiments are susceptible to many modifications of form, arrangement of parts, details and order of operation. The disclosure is intended to encompass all such modification within its scope, as defined by the claims.

What is claimed is:

1. A computer-implemented system for transmitting live content, the system comprising:
   a first delivery path for streaming live content data, without reordering a plurality of packets of the live content data, to a player device, and
   a second delivery path for streaming recorded content data to the player device, wherein the system is configured to transition from the first delivery path to the second delivery path in response to a seek and/or rewind request from the player device, wherein the seek and/or rewind request includes a request for one or more content segments of the live content data prior to the player device receiving the requested one or more content segments of the live content data from the first delivery path, wherein the recorded content data is of a prior content segment of the live content data, wherein in-order packets of the received plurality of packets are stored in a reorder buffer in proper packet order, wherein the reorder buffer is checked for the requested one or more content segments of live content data to determine whether the requested one or more content segments of live content data was received from the first delivery path.

2. The computer-implemented system of claim 1, wherein the live content data is encoded as a plurality of content segments in a file format that preserves media capabilities supported by a web browser, and the file format is wrapped in a streaming format for transmission using a streaming protocol.

3. The computer-implemented system of claim 2, wherein the file format is a media file format compatible with HLS or MPEG-DASH streaming.

4. The computer-implemented system of claim 2, wherein the media capabilities include at least one of digital rights management (DRM), content seek/rewind functionality, time-synchronized metadata, thumbnails, or stream replacement.

5. The computer-implemented system of claim 1, wherein the live content data includes in-band metadata relating to a betting event.

6. The computer-implemented system of claim 1, wherein the first delivery path includes a multicast path portion and a unicast path portion.

7. The computer-implemented system of claim 6, wherein the multicast path portion uses User Datagram Protocol (UDP).

8. The computer-implemented system of claim 6, wherein the unicast path portion uses Stream Control Transmission Protocol (SCTP).

9. The computer-implemented system of claim 6, wherein the unicast path portion uses a Web Real-Time Communication Data Channel.

10. The computer-implemented system of claim 6, wherein reliability and re-ordering functionality is disabled for the unicast path portion.

11. A computer-implemented method for transmitting live content, the method comprising:
    streaming live content data, via a first delivery path without reordering a plurality of packets of the live content data, to a player device;
    in response to receiving a seek and/or rewind request from the player device, transitioning to streaming recorded content data, via a second delivery path, to the player device, wherein the seek and/or rewind request includes a request for one or more content segments of the live content data prior to the player device receiving the requested one or more content segments of the live content data from the first delivery path, wherein the recorded content data is of a prior content segment of the live content data; and
    storing in-order packets of the received plurality of packets in a reorder buffer in proper packet order, wherein the reorder buffer is checked for the requested one or more content segments of live content data to determine whether the requested one or more content segments of live content data was received from the first delivery path.

12. The computer-implemented method of claim 11, further comprising:
    encoding the live content data as a plurality of content segments in a file format that preserves media capabilities supported by a web browser, and
    wrapping the file format in a streaming format for transmission using a streaming protocol.

13. The computer-implemented method of claim 12, wherein the encoding includes encoding time-synchronized meta-data relating to a betting event.

14. The computer-implemented method of claim 11, further comprising:
establishing a WebRTC Data Channel to provide a portion of the first delivery path.

15. A player device comprising:
at least one processor;
memory in communication with the at least one processor;
software code stored in the memory, which when executed at the at least one processor causes the player device to:
receive, by way of a first delivery path, a stream of live content data without reordering a plurality of packets of the live content data;
in response to user input to seek and/or rewind content, request the stream of recorded content data by way of a second delivery path, wherein the request is for one or more content segments of live content data prior to the player device receiving the requested one or more content segments of live content data from the first delivery path, wherein the recorded content data is of a prior content segment of the live content data; and
store in-order packets of the received plurality of packets in a reorder buffer in proper packet order, wherein the player device checks for the requested one or more content segments of live content data in the reorder buffer to determine whether the player device has received the requested one or more content segments of live content data from the first delivery path.

16. The player device of claim 15, wherein the software code, when executed at the at least one processor, further causes the player device perform packet re-ordering.

17. The player device of claim 15, wherein the live content data is provided to a Media Source Extensions (MSE) component within a web browser executing at the player device.

18. The player device of claim 15, wherein the software code, when executed at the at least one processor, further causes the player device to establish a WebRTC Data Channel to receive the stream of live content data.

19. The player device of claim 15, wherein the software code, when executed at the at least one processor, further causes the player device to decode time-synchronized meta-data relating to a betting event from the live content data.

20. The player device of claim 15, wherein the software code, when executed at the at least one processor, further causes the player device to transmit a bet request.

21. The computer-implemented system of claim 1, wherein at least some packets of the plurality of packets arriving out of order are discarded to avoid latency caused by reordering.

* * * * *